FIG. 1A

INVENTOR
RALPH E. DAVIS
BY
Cameron, Kerkam & Sutton
ATTORNEYS

United States Patent Office 3,399,349
Patented Aug. 27, 1968

3,399,349
AUTOMATIC RANGING ELECTRONIC
VOLTMETER
Ralph E. Davis, Rte. 1, Cohutta, Ga. 30710
Filed July 8, 1965, Ser. No. 470,533
12 Claims. (Cl. 324—115)

ABSTRACT OF THE DISCLOSURE

The present invention relates generally to electrical sensing circuits, and more particularly to electrical circuits for sensing electrical values and providing an output driving signal indicative of the magnitude and polarity of the sensed value for driving associated output devices.

Application of a potential across a voltage attenuator initiates an automatic switching sequence, the end result of which is the selection of a tap on the attenuator which yields a potential compatible with the basic sensitivity of a meter movement connected to the taps through the switching circuits. A plurality of active bridge circuits are provided which, in addition to driving the meter movement, are connected to effect automatic phasing of the meter movement with the polarity of a DC potential across the attenuator. The automatic switching sequence takes place in both directions, that is, downward as well as upward, so that the potential across the attenuator is monitored with respect to both amplitude changes and/or polarity reversal.

Automatic ranging includes measurement of both DC and AC potential by means of a manual switch which inserts into the circuit an AC attenuator, a peak-to-peak rectifier, a filter capacitor and a voltage dropping resistor between the input terminals of the DC circuitry and the DC attenuator thereof such that the DC input terminals thereby serve as AC input terminals for the meter.

Background of the invention

While the electrical sensing circuits of the present invention are adapted for use in a variety of applications such as, for example, automatic sensing, indicating or alarm circuits, it is especially well adapted for use with vacuum tube voltmeters (VTVM) to perform automatically the three functions of meter phasing, range selection and meter scale placement. Accordingly, the following description is directed primarily to this specific application of the inventive concept. By so doing, however, it is not intended to limit the scope of the invention or its application, because, as will be readily apparent, the inventive concept is adaptable to various other applications.

Because of continuing technological advances in the electronics industry, there is a continuing demand for more sophisticated measuring instruments which provide rapid and accurate information and eliminate time-wasting interpolations and approximations. The advantages of automatic measuring instruments have long been recognized; however, attempts to automate vacuum tube voltmeters have accomplished only a piecemeal solution to the problem and suffer from many serious disadvantages, the most common of which are the failure to eliminate cycling or hunting for the proper range when automatic range selection is provided, the failure to incorporate a search mechanism which is automatic with respect to polarity acceptance, and the failure to preserve meter linearity, particularly when incorporating solid state devices.

Accordingly, it is a primary object of the present invention to provide an electrical sensing circuit for driving associated output devices in response to the magnitude and polarity of a sensed electrical value.

Another object of the present invention is to provide an automatic VTVM which overcomes the aforementioned disadvantages of the prior art, and performs automatically the three functions of meter phasing, range selection and meter scale placement to provide rapid and accurate indications of measured electric values.

Another object is to provide a VTVM which is automatic with respect to polarity acceptance, and which eliminates cycling or hunting for a proper range scale for the measured electrical values.

A further object of the invention is to provide an automatic VTVM adapted to search and locate, without hesitation or false starts, a range scale compatible with the measured electrical value, and which wholly suppresses surges that cause aimless searching.

These and other objects and many of the attendant advantages of the present invention will become readily apparent from the following description of one specific embodiment of the inventive concept.

In general, the invention provides a high impedance VTVM which requires neither a manually operated switch to phase its meter polarity with the polarity of the measured electrical potential applied to its input for observation, nor a manually operated attenuator switch to select a sample of that applied potential which is compatible with an appropriate meter movement scale. Furthermore, the appropriate meter scale is automatically selected from a number of scales available and placed in view behind the meter movement pointer. The mechanical action of meter scale placement is always toward a selected scale, and there is no hunting through higher scales toward a lower scale or vice versa. Also, there is no return to an original position upon removal of the measured electrical potential from the meter input.

Summary of the invention

In accordance therewith, there is provided a signal rectifier and associated circuit elements which enable the meter to measure alternating current potentials as if they were direct current potentials. Switching of the VTVM from AC to DC acceptance or from DC to AC acceptance is accomplished by a multipole ratchet relay actuated by a singlepole, momentary contact switch on the meter input probe.

In measuring electrical values for certain electrical circuits such as phase comparators and frequency modulation demodulators, it is necessary to provide an instrument with a center-of-scale zero indication for proper measurement of the output from these circuits. To this end, in accordance with another aspect of the present invention, automatic operation of the VTVM may be defeated thereby allowing it to be used as a conventional, manually switched, vacuum tube voltmeter. Non-automatic operation is also utilized for observation of potentials of less than approximately 0.75 volt AC or DC, since such low potentials are generally below the critical threshold potential of automatic search circuits. Also, non-automatic operation is utilized for resistance measurements when the meter is used as an ohmmeter. When the instrument is switched to operate as an ohmmeter, a proper resistance scale is placed in register on the meter movement by the scale selector.

The several advantages of the instrument of the present invention over a conventional, manually switched VTVM are quite pronounced. The most outstanding advantage is the rapidity with which a number of potentials of varying amplitude and opposing polarity may be accurately observed within the same time as that required to observe a single potential of a given polarity applied to a conventional VTVM. Accuracy of meter deflection interpretation is assured by the fact that during a potential observation only one scale, directly calibrated, is in view, and polarity of the observed potential is automatically indicated visually by signal lamps. Therefore, there is no confusion in meter deflection interpretation due to the need for visual selection of one scale from several in view as in conventional meters, and the mental multiplication of the calibration numerals of that scale. This accuracy of meter deflection interpretation and polarity indication is additive to the rapidity with which a number of potentials may be observed.

As can be readily appreciated, the convenience in using the automatic VTVM of the present invention as compared to a conventional VTVM offers many other practical advantages. The absence of manual switching for scale and polarity selection eliminates not less than two body movements of the technician for each measured value or potential observation that involves a polarity reversal, a relatively large potential difference and/or a DC to AC, AC to DC acceptance difference from the last previously observed potential. Length of the meter's input lead is limited only by the distance at which meter scale calibration numerals can be read so that long input leads permit encirclement of a large piece of equipment under test, thereby eliminating the need for either moving the equipment or the instrument to make test points accessible.

While the specification concludes with claims particularly pointing out and distinctly claiming the subject matter of the present invention, the invention will be more clearly understood from the following detailed description thereof taken in connection with the accompanying drawings; however, it is to be expressly understood that these drawings are for the purpose of illustration only and are not intended to represent the full scope of the invention which is defined by the appended claims.

Figure 1A:
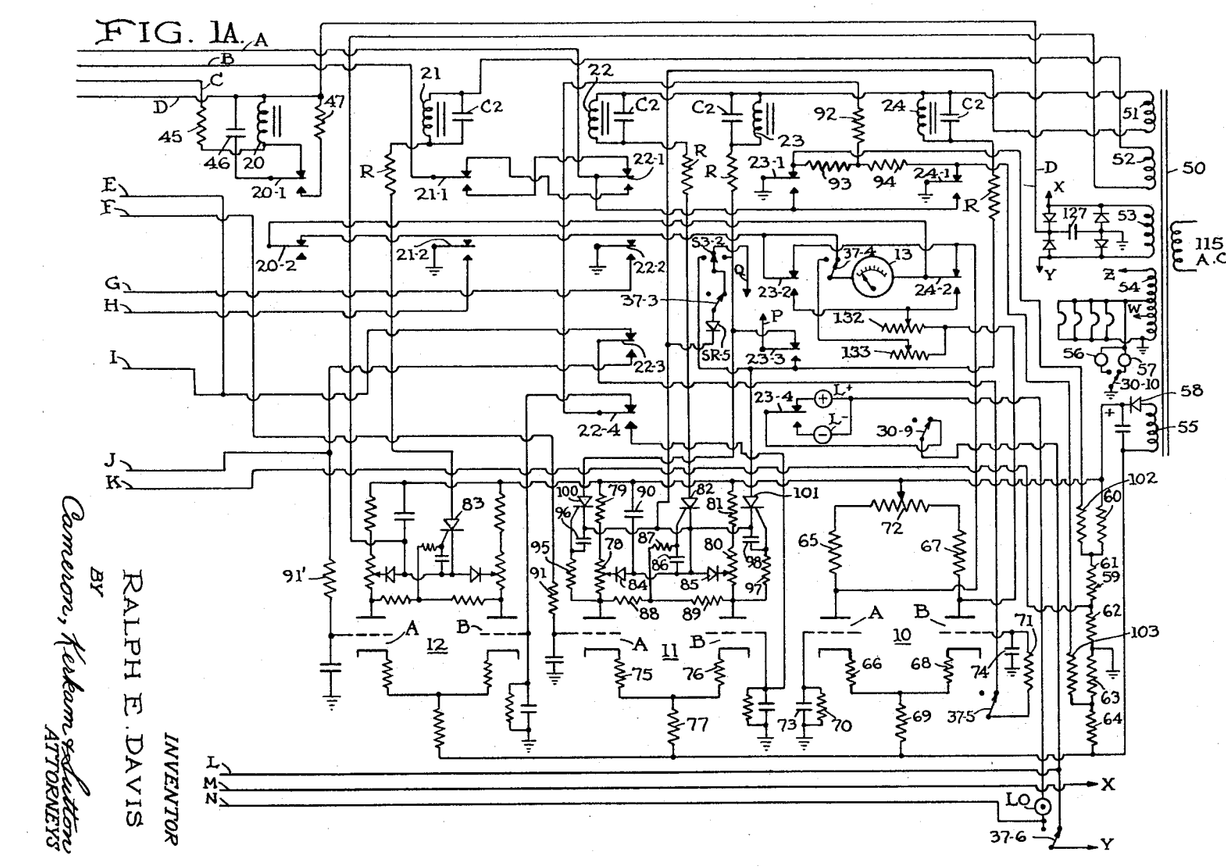
FIGS. 1A and 1B constitute a schematic circuit diagram of one form of VTVM embodying the present invention.
Figure 1B:
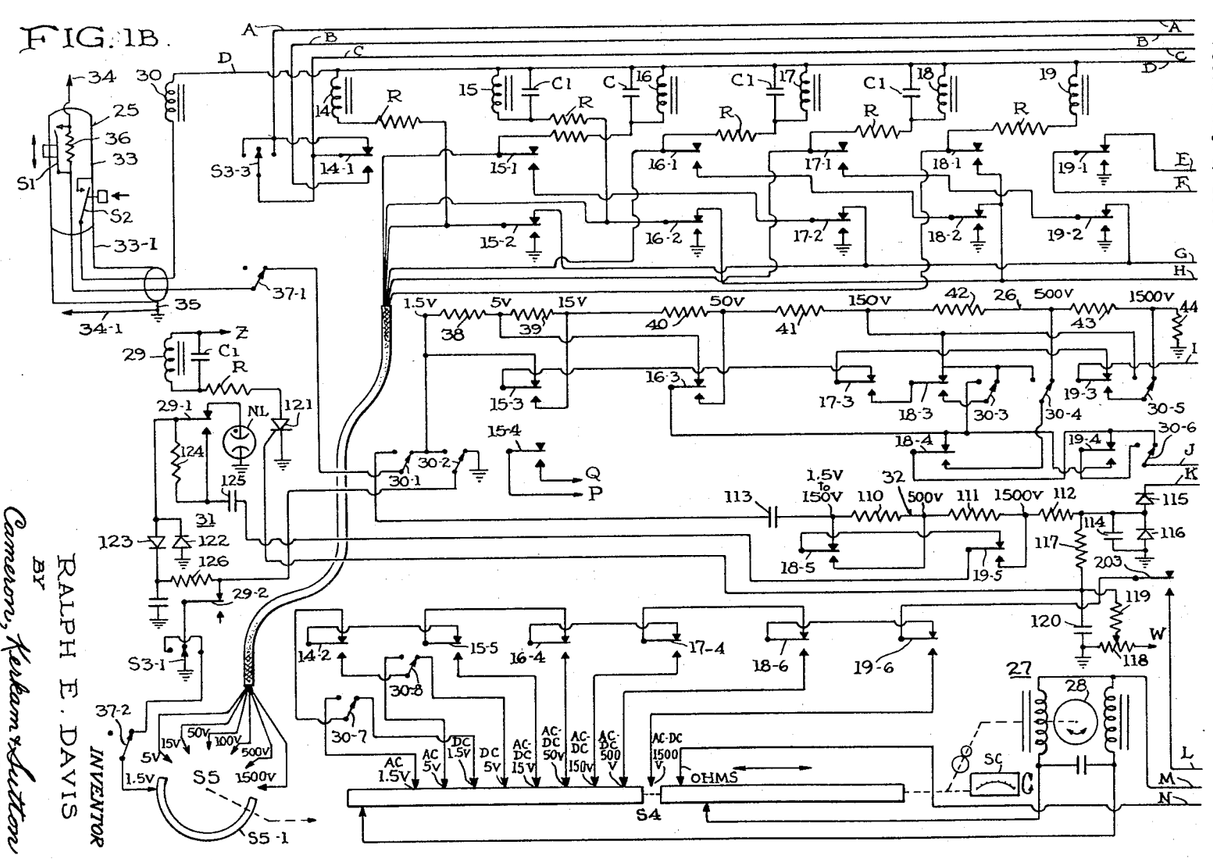

Referring to FIGS. 1A and 1B, it will be seen that both figures make up the entire electrical circuit for the VTVM, the lines terminating at the left of FIG. 1A being continued at the right of FIG. 1B so that the entire circuit is completed by joining the two figures. For convenience, each of the corresponding lines terminating at the left of FIG. 1A and at the right of FIG. 1B has been designated by a like reference character, from A to N. Thus, line A of FIG. 1A joins line A of FIG. 1B, line B of FIG. 1A joins line B of FIG. 1B, etc.

*Description of the preferred embodiment*

FIGS. 1A and 1B illustrate the meter circuits in their automatic DC configuration and in a condition of rest after having "observed" a plus or minus potential of over 500 volts. In this condition, switch S1 across isolating resistor 36 is open, all poles of the AC–DC function switch relay 30 are positioned to the right in its DC position, all poles of the ohms–E.M.F. switch 37 are positioned to the right in its E.M.F. position, range switch S5 is in an open circuit condition through the combination automatic defeat and polarity switch S3 which has its movable contact arm in the center or automatic position.

Generally, to facilitate a description of the electrical circuits and mode of operation, the automatic VTVM of the present invention may be separated into three configurations; a DC configuration, an AC configuration, and an ohmmeter configuration.

For convenience, the poles of each relay are designated by the reference numeral assigned to that relay followed by a number corresponding to a particular pole. Thus, by way of example, pole 30–2 signifies the second pole of AC–DC function switch relay 30. Poles 30–7 and 30–8 of AC–DC function switch relay are included in FIG. 1B to illustrate a method by which one or more scales calibrated for AC only may be substituted in the AC configuration for similar range scales in the DC configuration calibrated for DC only or for scales calibrated for use in either the AC or the DC configuration. Before proceeding to a detailed description of the electrical circuits making up the separate configurations, a general description of the operation thereof will be given for a better understanding of the overall operation of the individual circuits.

In the D.C. configuration, the VTVM comprises three vacuum tube bridge circuits 10, 11 and 12. Bridge circuit 10 is used to drive a microammeter movement 13, as in any conventional VTVM. The two additional bridge circuits 11 and 12 are sensors used to drive a series of multipole relays 14–24. When reference is hereinafter made to the driving or energization of a relay, it is meant that power is applied to the energizing coil of that relay.

The electrical value to be measured is applied to the input circuits of the VTVM by means of the input probe 25 which causes the sensor bridges 11 and 12 to drive the relays 14–24 through a rapid switching sequence resulting in their selection of the proper tap on a DC attenuator 26 which yields a sample input value proportional to the applied input potential or electrical value being measured and compatible with the basic sensitivity of the meter bridge 10. Simultaneously, energization of the relay 23 or 24 removes the first of two shunts from across the meter movement 13, phases the microammeter movement polarity with that of the electrical value being measured and relays 14 through 19 yield information to the meter scale selector mechanism 27.

Following the switching sequence, power is applied to the meter scale selector driving motor 28 and the second of two safety shunts formed by pole 20–2 of relay 20 in its deenergized condition is removed from across the meter movement 13. The first of two safety shunts is formed by poles 23–2 and 24–2 of multipole relays 23 and 24, respectively, in their deenergized condition. Upon removal of a potential from across the meter input, the first switching performed by the sensor driven relays removes power from the meter scale selector mechanism 27. This prevents unwanted searching by the selector mechanism after removal of a potential under observation.

By way of example, the meter scale selector mechanism may comprise a spring-loaded scroll SC driven by motor 28 which is of the reversible induction type. The scroll may be a parchment upon which are drawn meter scales corresponding to the various potential taps of the attenuators. For each scale position there is a mechanical detent which provides for exact register of that scale. The scale assembly is mounted behind the meter movement 13 so that the scale in use at any time is in view behind the meter pointer of the meter movement. A rotary switch S4 is driven in synchronism with the scroll and detent and adds a sense of direction of motor rotation to the range selection information received from the attenuator switching relays 14–19. Alternatively, other methods of scale selection could be utilized such as, for example, edge illumination of a stack of engraved plastic sheets, it being understood that the specific form of scale presentation forms no part of the invention claimed herein.

In the AC configuration, there is provided an AC sensor relay circuit comprising relay 29 and its associated energizing circuit which respond only to AC potentials at the meter input. Excitation of the AC sensor circuit removes a shunt from across the input of the DC attenuator 26, and measurement is effected through a peak-to-peak signal rectifier 31 and an isolating AC attenuator 32. The shunt is reinserted immediately after collapse of the AC sensor circuit upon removal of the AC excitation. This action prevents initiation of a search action toward lower range scale positions following removal of an AC potential observed which might otherwise result due to charged capacitors.

Excitation of the AC sensor circuit also removes a rectifier limiting circuit at the input to the rectifier, which circuit permits the use of low cost, high efficiency, solid state diodes in place of conventional vacuum tube diodes required in conventional circuits to withstand high inverse potentials, while the use of solid state diodes eliminates the need for a bucking potential to offset the space charge of vacuum diodes.

In order to avoid repetition of details, various part functions are grouped as follows: each of the capacitors C1 across the coils of relays 15, 16, 17 and 18 is a storage capacitor which permits its related relay to be keyed from a drop-out or deenergized position to a pull-in or energized position without chatter; resistors R in series with the relay coils 14–19, relay coils 21–24 and relay coil 29 are current limiting resistors; and the capacitors C2 across each of the coils of relays 21, 22, 23 and 24 serve as smoothing capacitors for the rectified AC current to their respective coils.

Resistor 45 in series with the energizing coil of relay 20 and capacitor 46 across the coil of relay 20 through pole 20–1 in the deenergized or drop-out position form a time-delay circuit which prevents relay 20 from assuming its pull-in position prematurely. Upon energization of relay 20, capacitor 46 is removed from across the coil 20. Thus, relay 20 may drop out without delay when deenergized and resistor 47 provides a discharge path for capacitor 46 during the time that relay 20 is in its energized position.

All switching necessary to effect meter phasing, range selection and scale placement is performed automatically by the relays driven by bridges 11 and 12, and is accomplished almost instantly upon the application of a potential for observation. Bridge 11 drives either relay 23 or relay 24 and through relay 22 drives relays 14, 16 and 18. Bridge 12 drives relays 15, 17 and 19 through relay 21.

When relays 15, 17 and 19 are deenergized, a closed circuit exists between the normally closed contact of pole 22–3 and the 1.5 volt tap on the DC attenuator 26. Energization of relay 15 connects the normally closed contact of pole 22–3 to the 15 volt tap; energization of relay 17 connects the normally closed contact of pole 22–3 to the 150 volt tap; and energization of relay 19 connects the normally closed contact of pole 22–3 to the 1500 volt tap.

When relays 16 and 18 are deenergized, a closed circuit exists between the normally open contact of pole 22–3 and the 5 volt attenuator tap of the DC attenuator 26. Energization of relay 16 connects the normally open contact of pole 22–3 to the 50 volt tap on the DC attenuator 26, while energization of relay 18 connects the normally open contact of pole 22–3 to the 500 volt tap.

For convenience, line I leading to the normally closed contact of pole 22–3 will be referred to as buss A, and the term buss B will be used to refer to line J leading from the normally open or lower contact of pole 22–3. Since the control grid of bridge 10 terminates at pole 22–3, the grid is alternately switched between buss A and buss B upon the alternate deenergization and energization of relay 22.

Input to the meter is obtained through the input probe 25 comprising a housing 33, a length of shielded cable 33–1 and a contact 34 extending from the housing. Contact 34 and neutral lead 34–1 are adapted to be placed in contact with the value to be measured in a conventional manner. Housing 33 may be grounded through cable 33–1 as at 35, and supports internally thereof an isolating resistor 36 connected at one end to contact 34 and at its other end through the E.M.F. contact 37–1 of ohms-E.M.F. switch 37 to pole 30–1 of relay 30. Housing 33 further includes switches S1 and S2. Switch S1 may be a slide switch and is in its open position across isolating resistor 36 only in the DC configuration. Switch S2 is a single-pole, spring loaded, normally open switch adapted to be momentarily closed for activating AC–DC function switch relay 30. (Advantageously, switches S1 and S2 may be mechanically ganged so that a slight pressure on switch S2 effects closing of its contacts without altering the open or closed position of switch S1.)

As hereinbefore described, input to the meter is applied from the input probe through pole 30–1 across the DC attenuator 26 which consists of seven series connected resistors 38–44, the ohmic values of which are such that the several junctions provide taps which yield voltage ranges of 1.5 volts, 5 volts, 15 volts, 50 volts, 150 volts, 500 volts and 1500 volts. Thus, basic sensitivity of the meter is, as implied by the attenuator, 1.5 volts.

Referring now to FIG. 1A, power input to the VTVM is obtained from a commercial 115 volt AC source applied to the primary winding of transformer 50. Advantageously, transformer 50 includes a plurality of secondary windings 51–55 which provide the operating potentials for the various circuits.

The output of secondary winding 51 drives relays 22–24 through sensor bridge 11, while the output of secondary winding 52 drives relay 21 through sensor bridge 12. Secondary winding 53 is connected to a suitable bridge rectifier, the output of which is connected to line D which is the common power buss for relays 14–20 and 30. In addition, winding 53 is connected through terminals X and Y to driving motor 28 of the meter scale selector mechanism 27.

Winding 54 is provided with a plurality of taps, the center tap and a grounded tap or end terminal being connected across the filament windings of the vacuum tubes and the AC indicating lamp 56 and DC indicating lamp 57 which have their circuits returned to ground through poles 30–10 of relay 30. Terminal W of winding 54 provides a 1 volt output and is connected to the AC threshold control variable resistor 118, while terminal Z is connected to the power buss of relay 29.

DC operating power for the bridge circuits is provided by rectifier 58 connected to secondary winding 55 and the voltage divider 59 comprising serially connected resistors 60–64, the junction of resistors 62 and 63 being returned to ground.

Each of the bridge circuits 10–12 comprises a pair of triodes which may be either vacuum tubes or solid state devices. The triodes of bridge 10, referred to as 10A and 10B, are connected in combination with resistance elements 65, 66, 67, 68, 69, 70, 71 and 72 and capacitor elements 73 and 74. The anodes of triodes 10A and 10B are connected to the voltage divider 59 through resistors 65 and 67 and balancing resistor 72, while the cathodes are returned to resistor 64 at the lower end of the divider through resistors 66 and 68 connected in series with resistor 69. The grid electrode of triode 10A is returned to ground through the RC filter network comprising resistor 70 and capacitor 73, while the grid electrode of triode 10B is switched to various taps on the DC attenuator 26 through filter resistor 71, pole 37–5 of the ohms-E.M.F. switch 37 and pole 22–3 of relay 22. Filter capacitor 74 is connected between the control electrode of 10B and ground.

Sensor bridges 11 and 12 are similar to bridge 10; however, they are designed to accept a potential at their respective input control grids somewhat in excess of 5 volts positive without drawing grid current. When reference is made herein to the control grid of a bridge circuit, it means that grid of the bridge circuit which is switched to various taps on the DC attenuator, i.e., the grid electrodes of the triodes 11A and 12A of bridges 11 and 12 and the triode 10B of bridge 10. The opposite grid of each bridge circuit, i.e., the grid electrodes of the triodes 11B and 12B of bridges 11 and 12 and the triode 10A of bridge 10, is normally returned to ground, but the opposite grids of bridges 11 and 12 may be supplied with a small potential of opposite polarity to that of the potential present on the control grid. Each of the balanced bridge circuits 11 and 12 has the cathode and anode electrodes of its triodes connected to the voltage divider in a manner similar to bridge 10, but does not include a balancing resistor. Bridges 11 and 12 differ from bridge 10, but are alike in that their outputs are used to trigger solid state switch 82 and 83, respectively, which may be, for example, silicon controlled switches.

Silicon controlled switches, hereinafter referred to simply as SCS, are well known electrical circuit components recently added to the list of functional elements available to the electrical and electronic industries. Such as SCS is a three junction semiconductor device with reverse characteristics similar to a normal semiconductor rectifier in that it represents essentially an open circuit with negative anode-to-cathode voltage. The forward characteristic is such that it will block positive anode-to-cathode voltages below a critical break-over voltage if no signal is applied to the gate terminal. However, by exceeding the forward break-over voltage or applying an appropriate gate signal, the device will rapidly switch to a conducting state and present the characteristically low forward voltage drop of a single junction semiconductor rectifier. The device differs from a silicon controlled rectifier in that it can be fired by a minute current at a very low potential. One such SCS device suitable for use in the present invention is the 3N58 silicon controlled switch made commercially available by the General Electric Company.

The triodes 11A and 11B of bridge 11 have their cathode electrodes connected to the voltage divider 59 through resistors 75 and 76 and common cathode resistor 77. The anodes of triodes 11A and 11B are returned to the positive end of the voltage divider through a variable resistor 78 and fixed resistor 79, and a variable resistor 80 and fixed resistor 81, respectively. The resistance values of corresponding resistors in the triode circuits 11A and 11B are equal, that is, the resistance value of resistor 75 is equal to the resistance value of resistor 76, 88 equals 89, 78 equals 80, 95 equals 97 and 79 equals 81. Variable resistors 78 and 80, in the output circuit of bridge 11, and the corresponding resistors in the output circuit of bridge 12, provide means for applying opposing negative potentials to the gate electrodes of the SCS 82 and 83.

To this end, the variable tap on resistor 78 is connected to the cathode of diode 84, while the variable tap on resistor 80 is connected to the cathode of diode 85. The junction of the anodes of diodes 84 and 85 is connected to the cathode electrode of SCS 82. The gate of SCS 82 is coupled through filter resistor 87 to the junction of resistors 88 and 89 connected between the anodes of triodes 11A and 11B. Capacitor 86 and resistor 87 form a filter at the gate of SCS 82. Capacitor 90, connected between the positive buss and the junction of the anodes of diodes 84 and 85, provides suitable pulse suppression of random pulses between the cathode of SCS 82 and the DC supply for bridge 11. A similar pulse suppressing capacitor is provided in bridge 12.

It will be seen from FIG. 1A that the circuit hereinbefore described for controlling SCS 82 of bridge 11 and that for controlling SCS 83 of bridge 12 are identical. Therefore, a repetition of the circuit description is unnecessary. However, it will be noted that bridge 11 differs from bridge 12 in that the control grid of bridge 11 is returned through resistor 91 and the normally closed contacts of pole 19-1 of relay 19 (FIG. 1B) to the upper contact of pole 22-3 of relay 22, while the control grid of bridge 12 is returned through resistor 91' to the lower contact of pole 22-3 of relay 22. The opposite grid of bridge 11 is returned to the lower contact of pole 22-4 of relay 22, while the opposite grid of bridge 12 is returned to the upper contact of pole 22-4 of relay 22. The movable contact of pole 22-4 is connected to the T-resistive network comprising resistors 92, 93 and 94 for application of a hold potential.

The hold potential is derived through the T-network and resistors 102 and 103 from taps on the bleeder circuit of the voltage divider 59 of the meter DC supply. Polarity of the hold potential presented to the opposite grid of triode 11B or 12B is determined by the energization of relays 23 and 24 and the closing of their respective poles 23–1 and 24–1 which return opposite ends of the branch of the T-network formed by resistors 93 and 94 to ground. When both relays 23 and 24 are deenergized, there is no hold potential available. When relay 24 is energized, the hold potential is negative and when relay 23 is energized the hold potential is positive. Relays 23 and 24 cannot be energized simultaneously when meter is in automatic configuration. Pole 22–4 of relay 22 determines to which of bridges 11 and 12 the hold potential will be applied.

The polarity of the output of each of the bridges 11 and 12 is controlled by the solid state blocking diodes 84 and 85 of bridge 11 and the corresponding diodes of bridge 12. A positive-going output is provided from bridge 11 or 12 with either a positive or negative potential applied to its input. Variable resistors 78 and 80 in the output circuit of bridge 11, and the corresponding variable resistors of bridge 12, provide means for applying an opposing negative potential to the gate of the corresponding SCS. Adjustment of the gate bias for the SCS permits the establishment of a bridge input threshold voltage of plus or minus 1.5 volts to trigger the SCS 82 and 83.

Bridge 11 is further provided with two SCS 100 and 101 which are similar to the silicon control rectifier 82. The anodes of SCS 100 and 101 are connected to relays 23 and 24, respectively, while their cathodes are connected to the junction of the anodes of diodes 84 and 85 with the cathode of SCS 82. The gate of SCS 100 is connected to the anode of triode 11A through filter resistor 95, while the gate of SCS 101 is connected to the anode of triode 11B through filter resistor 97.

SCS 100 and 101 phase the meter movement of bridge 10 through energization of relays 23 and 24 and associated poles 23–2 and 24–2 respectively. The output of triode 10A is connected to one side of the meter movement through the upper contact of pole 24–2 of relay 24, and the output of triode 10B is connected to the same side of meter movement through the lower contact of pole 24–2 of relay 24 in series with calibrating resistance 132. The movable contact of pole 24–2 is further connected to a meter movement shunt circuit formed by the contacts of pole 20–2 and pole 23–2. Pole 37–4 serves to connect the meter movement to the ohms adjust resistor 133.

Circuit parameters of bridge 11 are such that an adjustment of R78 and R80 which provides a plus or minus 1.5 volt threshold to its input which triggers the SCS 82 simultaneously results in a threshold potential of approximately plus 0.5 volt to trigger SCS 101, or minus 0.5 volt to trigger SCS 100. A potential in excess of plus or minus 0.5 volt at the input of bridge 11 causes relay 23 or 24 to be energized, and a potential in excess of plus or minus 1.5 volts at the control grid of bridge 11 or 12 causes the bridge circuit to be unbalanced sufficiently to fire SCS 82 or SCS 83 in addition to SCS 100 or SCS 101.

Each of the bridges 11 and 12 is extremely sensitive at its threshold of plus or minus 1.5 volts. Minute potential fluctuations around plus or minus 1.5 volts cause the bridges to trigger their respective SCS on and off in an attempt to follow the fluctuations. To prevent erratic bridge behaviour around the 1.5 volt threshold, which, in turn, causes the scale selector mechanism to oscillate back and forth between some two adjacent scales, the bridges are supplied alternately at their normally grounded grids with a potential of such magnitude and polarity that a "key off" threshold of approximately plus or minus 1.3 volts is established. This potential is provided upon the switching of pole 22–4 connecting the opposite grids to resistor 92 of the T-network.

In operation of the circuit, since up to six circuits may be simultaneously switched by the closing or opening of a given relay, no ordered sequence in switching can be described. However, a description of the various pertinent circuit conditions before and/or after closure or opening of a named relay will be given.

*At rest* (all relays deenergized).—Buss A terminates at the 1.5 volt tap on the DC attenuator 26. The input to the control grid of triode 10B is applied from buss A. Buss B terminates at the 5 volt tap on the DC attenuator. Rotary switch S4 is connected through poles 30–7 and 14–2 with 1.5 volt DC scale information, but the running circuit of motor 28 is open. Poles 23–2 and 24–2 of relays 23 and 24 form a shunt across the meter movement. Poles 20–2 of relay 20 also shunts the meter movement.

Assuming that a potential is applied to the instrument which rises from 0 to over 500 volts, the following sequences describe various circuit conditions which occur.

*Sequence 1A* (applied potential over plus 0.5 volt, but less than plus 1.5 volts).—Bridge 11 is unbalanced and an output from triode 11B through SCS 101 energizes relay 24. Pole 24–2 is moved to its lower position, removing one of the two shunts from across the meter movement, placing movement in proper phase across bridge 10 anodes through calibrating resistor 132. Pole 24–1 removes the ground from resistor 94 of the T-resistor network and connects the ground to one end of relay 20 through pole 14–1 and resistor 45, thus energizing relay 20 after a delay determined by the time constant of resistor 45 and capacitor 46. Pole 20–3 closes the energizing circuit of motor 28 through poles 14–2, 15–5, 16–4, 17–4, 18–6 and 19–6 and the rotary switch S4, while the positive indicating lamp L+ is energized through the upper contact of pole 23–4. Pole 20–2 removes the second shunt from across the meter movement, and the scale selector mechanism selects and registers the 1.5 volt scale. Pole 20–1 removes capacitor 46 from across the coil of relay 20 and places it across resistor 47, thereby causing it to be discharged in order that it may be effective when placed back into the RC delay circuit formed by resistor 46 and capacitor 47.

*Sequence 1B* (applied potential over minus 0.5 volt, but less than minus 1.5 volts).—Bridge 11 is unbalanced and an output from triode 11A through SCS 100 energizes relay 23. The resulting operations are similar to those described in Sequence 1A except that pole 23–4 energizes the negative polarity indicating lamp L−, pole 23–2 opens one of the two meter shunts, places meter movement in proper phase across bridge 10 anodes and pole 23–1 energizes relay 20 through pole 14–1.

*Sequence 2* (applied potential over plus or minus 1.5 volts, but less than plus or minus 5 volts).—Depending on whether the input is positive or negative, either relay 23 or relay 24 will be energized as hereinbefore described. Control rectifier 82 is switched to energize relay 22. Relay 14 is energized through pole 15–2 and the lower contact of pole 22–2 which is returned to ground. Pole 22–4 switches the holding potential from the grid electrode of triode 12B to the grid electrode of triode 11B. The running circuit of motor 28 is energized through poles 14–2, 15–5, 16–4, 17–4, 18–6, 19–6, 20–3 and S4 upon a delayed energization of relay 20 as hereinbefore described. Pole 22–3 switches the input of bridge 10 from buss A to buss B, so that the input to the control grid of triode 10B is connected to the 5 volt tap on DC attenuator 26. Pole 14–2 furnishes 5 volt information to the rotary switch S4, and the scale selector mechanism selects and registers the 5 volt scale.

*Sequence 3* (applied potential over plus or minus 5 volts, but less than plus or minus 15 volts).—Bridge 12 is unbalanced sufficiently to key SCS 83 on, thus causing relay 21 to be energized. SCS 82 of bridge 11 is turned off deenergizing relay 22. Relay 15 is energized through pole 16–2 and pole 21–2 which has its lower contact returned to ground. Pole 21–1 maintains relay 20 closed through pole 22–1. Pole 22–4 switches the holding potential from bridge 11 to bridge 12. Pole 22–3 switches the input to bridge 10 from buss B to buss A. Pole 15–2 establishes a hold circuit for relay 14, while pole 15–3 switches buss A from the 1.5 volt tap on the DC attenuator 26 to the 15 volt tap. This places the control grid of triode 10B of bridge 10 on the 15 volt tap. Pole 15–4 causes either relay 23 or relay 24 to be held energized through a rectifier diode SR5 shunted across SCS 100 or SCS 101 as determined by relay pole 23–3. Pole 15–5 supplies 15 volt scale information to the rotary switch S4, and the scale selector mechanism selects and registers the 15 volt scale.

*Sequence 4* (applied potential over plus or minus 15 volts, but less than plus or minus 50 volts).—Energization of relays 21 and 22 is reversed so that relay 21 is deenergized and relay 22 is energized. Pole 22–2 causes relay 16 to be energized through pole 17–2 and pole 15–1. Thus, relay 16 cannot be energized until relay 15 is energized. Pole 16–2 serves to hold in relay 15, and pole 16–3 switches buss B from the 15 volt tap on the DC attenuator 26 to the 50 volt tap placing the control grid of triode 10B on the 50 volts tap. Pole 16–4 furnishes 50 volt scale information to the rotary switch S4. Poles 22–1, 22–3 and 22–4 will switch as in Sequence 2, and the scale selector chooses the 50 volts scale.

*Sequence 5* (applied potential over plus or minus 50 volts, but less than plus or minus 150 volts).—The relays 21 and 22 are again reversed so that relay 22 is deenergized and relay 21 is energized. Pole 21–2 causes relay 17 to be energized through poles 18–2 and 16–1. Thus, relay 16 must be energized before relay 17 can be energized. Pole 17–2 holds in relay 16 through pole 15–2, and pole 17–3 serves to switch buss A from the 15 volts tap on the DC attenuator 26 to the 150 volt tap, while pole 17–4 furnishes 150 volts scale information to the rotary switch S4. Poles 21–1, 22–3 and 22–4 switch as in Sequence 3 so that the control grid of triode 10B is placed at the 150 volt tap of the DC attenuator. The scale selector mechanism is thus energized to select the 150 volts scale.

*Sequence 6* (applied potential over plus or minus 150 volts, but less than plus or minus 500 volts).—The relays 21 and 22 are again reversed so that relay 21 is deenergized and relay 22 is energized. Relay 18 is energized through poles 22–2, 19–2 and 17–1. Thus, relay 18 cannot be energized unless relay 17 is energized. Pole 18–2 serves to hold in relay 17 through pole 16–1, and pole 18–4 switches buss B from the 50 volt attenuator tap to the 500 volt tap, while pole 18–6 provides 500 volts scale information to the rotary switch S4. Poles 22–1, 22–3 and 22–4 switch as in Sequence 2, the input to triode 10B is connected through the 500 volt tap, and the scale selecting mechanism chooses the 500 volt scale.

*Sequence 7* (applied potential over plus or minus 500 volts).—Relays 21 and 22 are again reversed, relay 21 being energized and relay 22 deenergized. Relay 19 is energized through poles 21–2 and 18–1, energization of relay 19 being delayed until relay 18 is energized. Pole 19–2 establishes a holding circuit for relay 18 through pole 17–1, while pole 19–1 grounds the control grid of triode 11A. Pole 19–3 switches buss A from the 500 volts tap on the DC attenuator to the 1500 volt tap, while pole 19–6 furnishes 1500 volts scale information to the rotary switch S4. Poles 21–1, 22–3 and 22–4 switch as in Sequence 3, and the control grid of triode 10B is connected through buss A to the 1500 volt tap on the attenuator. The rotary selector mechanism 27 is thus energized to select the 1500 volts scale.

As hereinbefore described, during the absence of any potential at the meter input, all relays are deenergized. In this condition, the control grid of triode 11B of bridge 11 is on the 1.5 volt tap of the DC attenuator 26 and the control grid of the triode 12B of bridge 12 is on the 5 volt tap of the DC attenuator. Application of any potential in excess of plus or minus 5 volts therefore causes the meter to assume instantly, or leap into, Sequence 7. Then, for any potential less than plus or minus 500 volts, bridges 11 and 12 are alternately maintained in an unbalanced condition sufficient to key their respective SCS 82 and 83 into conduction thereby energizing alternately the corresponding relays 21 and 22. Also, either relay 23 or relay 24 will be energized when the bridge is unbalanced depending upon the polarity of the input. The alternate conditions of bridges 11 and 12 and relays 21 and 22 will continue until a tap on the DC attenuator 26 is located which yields a potential large enough to stop continued searching through descending sequences.

The alternating behaviour of relays 21 and 22 during a search will repeatedly provide a momentarily closed circuit through the energizing coil of relay 20. The time constant of capacitor 46 and resistor 45, however, delays the energization of relay 20 until searching is completed. To this end, for any of Sequences 2–7 either relay 21 or relay 22 is energized, that is, either relay 21 is energized and relay 22 deenergized, or relay 21 deenergized and relay 22 energized. This condition is required to maintain a closed circuit to the energizing coil of relay 20 through normally open pole 14–1 and whichever of poles 23–1 and 24–1 is closed. A change in sequence, either up or down, momentarily causes both relays 21 and 22 to be either energized or deenergized, thereby breaking the circuit to the energizing coil of relay 20. When relay 20 is deenergized, the motor running circuit of the scale selector mechanism 27 is interrupted through the open contacts of pole 20–3. Deenergization of relay 20 results in discharged capacitor 46 being connected across the operating coil of relay 20, whereupon the delay provided by the same constant of capacitor 46 and resistor 45 prevents relay 20 from being energized on any series of pulses that may be received as relays 21 and 22 drive the attenuator tap selector relays through several search sequences. Thus, the scale selector mechanism cannot run until a search is completed.

During Sequence 1A or 1B, both relays 21 and 22 are deenergized so that their poles present an open circuit to the energizing coil of relay 20. Since relay 14 is also in a deenergization condition, the open circuit is shunted by pole 14–1 and relay 20 can now be energized upon energization of either relay 23 or relay 24. Therefore, pole 14–1 permits a 1.5 volt scale selection when either the switching sequence does not go above Sequence 1A or 1B, or returns there from some higher sequence.

As previously described, the instrument can be converted into non-automatic configuration by the use of two defeat switches, lock switch S3 and range switch S5 (FIG. 1B). Lock switch S3 is a three-pole, three-position switch of the rotary type. For convenience, the poles of lock switch S3 are designated as S3–1, S3–2 and S3–3, similarly to the relay poles. Positioning of lock switch S3 in its center position provides for automatic operation, while positioning to either side of center determines the polarity acceptance. Positioning to the right of center establishes negative acceptance and positioning to the left of center establishes positive acceptance.

Pole S3–3, in either position off center, shunts the normally closed pole 14–1, thereby defeating the alternate switching feature of relay poles 21–1 and 22–1. Pole S3–2, when positioned to the left of center, shunts diode SR5 across the SCS 101, thereby energizing relay 24 and polarizing bridge 10 for positive acceptance. To this end, the anode of diode SR5 is connected through pole 37–3 to the movable contact element of pole S3–3, and the cathode of SCS 101 is connected to the cathode of rectifier SR5. In the position to the right of center, SR5 is connected across SCS 100, thereby energizing relay 23 and polarizing bridge 10 for negative acceptance. Pole S3–1 in either position off center provides continuity for the range switch S5.

Range switch S5 is a two-pole, seven-position switch of the rotary type. Each of the positions of the first pole S5–1 corresponds to a particular voltage scale between 1.5 and 1500 volts so that rotation of the switch progressively closes relays 14–19 through pole S3–1 in either position off center. The second pole of switch S5, not shown, forms the range selector in ohmmeter service. This section permits use of the bridge 10 in a conventional ohmmeter circuit, and its switching is analogous to that of the function switch of a conventional VTVM. Since none of the automatic switching circuits function when the instrument is in ohmmeter service, no circuit description will be given other than to state that pole 6 of the ohmmeter section of switch 37 drives the scale selector to an ohmmeter scale, breaks the continuity to the polarity indicating lamps L+ and L−, and excites the indicator lamp L0 to indicate that the meter is functioning as an ohmmeter.

It should be apparent that even in the defeated configuration, that is, non-automatic operation, if the polarity of the potential presented at the input is opposite to the pre-selected polarity, a shunt immediately appears across the meter movement due to the simultaneous energizing of relays 23 and 24. Thus, the meter movement cannot be damaged by a reverse drive. Also, since the automatic switching action of the instrument is undisturbed above the sequence corresponding to a pre-selected range scale, the meter movement is protected against an over-drive by a potential in excess of any pre-selected range scale.

In the alternating current configuration, in addition to relay 29, the alternating current input circuit includes the AC attenuator 32 and a signal rectifier 31 (FIG. 1B). AC attenuator 32 comprises three resistors 110, 111 and 112 connected in series. The upper (left) end of resistor 110 is connected to the input probe 25 through isolating capacitor 113 and the AC contact of pole 30–1. The lower (right) end of resistor 112, instead of returning to ground directly, is returned through the AC impedance of capacitor 114 and the DC impedance of diodes 115 and 116.

Diodes 115 and 116 are connected in series between ground and the DC bias source 59, with the junction of the diodes formed by the cathode of diode 116 and the anode of diode 115 being connected to the lower end of the AC attenuator 32 at the junction of resistors 112 and 117. The cathode of diode 115 is returned to ground through a tap on the DC supply bleeder at the junction of resistors 61 and 62 which is maintained at approximately plus 0.75 volt. Diode 115 forms a clamp across capacitor 114 which prevents a potential from appearing at the gate of the AC SCS 121 through resistor 117 far in excess of the approximate plus 0.6 volt needed for keying.

Variable resistor 118 provides an adjustable threshold control for SCS 121 through resistor 119 and is connected across ground and terminal W of secondary winding 54 which provides a bias source of approximately 1 volt. Potential at the 1 volt tap W on winding 54 is in phase with the anode supply to SCS 121 connected in series the control relay 29. The bias is therefore in the forward, or positive, direction and is adjusted through resistor 118 to a value which will cause SCS 121 to fire when approximately 0.75 volt AC is present at the instrument input, the variable tap on resistor 118 being connected through voltage dropping resistor 119 to the gate of the control rectifier 121. The cathode of rectifier 121 is returned to ground, while the anode is connected in series with relay 29. Capacitor 120 serves to suppress random surges at the gate of SCS 121.

The signal rectifier 31 comprises a pair of reversely poled diodes 122 and 123. The anode of diode 122 is returned to ground, while its cathode, along with the anode of diode 123, is connected to the movable contact of pole 29–1. The normally open contacts of pole 29–1 are shunted by resistor 124 which is returned to ground through the normally closed contacts of pole 29–1 and neon lamp NL connected in series therewith. The lower contact of pole 29-1 is connected in series with a doubling capacitor 125 which is in turn connected to one of the taps on the AC attenuator 32 through poles 18-5 and 19-5.

Resistor 124 serves as a voltage dropping resistor to limit current through the neon lamp NL in conduction. Resistor 126 connected between the anode of diode 123 and the 1.5 volt tap of the DC attenuator 26 forms a voltage divider across the rectifier output such that the ratio of the RMS AC rectifier input to DC potential across the DC attenuator is 1/1. Division of the rectifier output in this manner permits use of a single meter scale to indicate either DC or AC RMS potential. Additional markings on a given scale may be utilized if desired to indicate peak-to-peak AC potentials. The junction of resistor 126 and resistor 38 of the DC attenuator 26 is returned to ground through pole 29-2 and the center contact of pole S3-1 for automatic operation.

Switching the meter circuits from direct current configuration to alternating current configuration operation, is accomplished by momentary pressure on switch S2, the AC-DC switch located on the instrument probe 25, which, in turn, energizes the AC-DC multipole ratchet relay 30. Pole 30-1 switches the meter probe input from the DC attenuator 26 to the AC attenuator 32, through isolating capacitor 113, thence through poles 18-5 and 19-5 to doubling capacitor 125. In the illustrated form of the invention, the AC attenuator 32 is provided with taps of 150 volts, 500 volts and 1500 volts which correspond to Sequences 5, 6 and 7 hereinbefore described in the automatic switching operation. Each yields a maximum potential of 150 volts DC at the rectifier output filter terminating at the DC attenuator by limiting AC potential at the rectifier input to 150 volts RMS.

AC attenuator 32 serves three functions. It provides a path for the charging current of doubling capacitor 125 through rectifier 122, and it serves to limit AC potentials to the input of the rectifier. The third function of the attenuator is to key the gate of the AC control rectifier 121 to switch it into conduction, thereby energizing relay 29 in series therewith when, and only when, AC potential is present at the instrument input. To this end, the lower end of the AC attenuator 32 is returned to ground from resistor 112 through the AC impedance of capacitor 114 and the DC impedance of diodes 115 and 116, the net impedance of which is so low that the normal function of the AC attenuator is undisturbed.

AC potentials applied to the instrument which are under the approximate 60 volt firing potential of the neon lamp NL cause the doubling capacitor 125 to draw a charging current through diode 122 and the AC attenuator 32, thus providing a positive DC keying potential for the AC SCS 121. AC potentials in excess of 60 volts cause the neon lamp to fire. When the neon lamp NL conducts, diode 122 is shunted and doubling capacitor 125 can receive no charging current through this diode. However, during any shunting of diode 122, SCS 121 receives a keying potential by means of charging current drawn by capacitor 113 through diode 116.

In operation, pole 29-1 first removes the neon lamp NL from across the input of rectifier 31, and then shunts the resistor 124 when the SCS 121 fires, energizing relay 30. Simultaneously, pole 29-2 removes the shunt to ground from across the DC attenuator 26 and switches the signal rectifier output from ground to the DC attenuator. The time delay presented by capacitor 125 and resistor 124 during the interval of switching of pole 29-1 is sufficient to prevent an excessive inverse potential build-up across diodes 122 and 123 before the automatic switching can leap into Sequence 7, and to allow the AC attenuator 32 to perform its normal limiting function.

Switching performed by poles 30-3 through 30-6 which are connected to various taps on the DC attenuator, along with relay poles 18-5 and 19-5, maintains an ordered switching sequence of buss A, buss B and the control grid of bridge 10. That is, in Sequence 5, buss A is maintained on the 150 volt tap of the AC attenuator 32, buss B is connected to the 50 volt tap, and the control grid of bridge 10 is connected to buss A. In sequence 6, buss B is connected to the 150 volt tap on the AC attenuator, buss A is connected to the 50 volt tap, and the control grid of bridge 10 is connected to buss B. Sequence 7 is a repetition of Sequence 5. Poles 18-5 and 19-5 form tap switches associated with the AC attenuator 32 for the purpose of switching the input of the signal rectifier 31 to potentials compatible with Sequences 5, 6 and 7.

There is thus provided by the present invention an automatic VTVM by which a number of potentials of varying amplitude and opposing polarity may be observed with unusual rapidity and accuracy. Although the invention has been described with reference to a vacuum tube voltmeter, it will be readily apparent to those skilled in the art that various modifications may be made without departing from the inventive concept and that the switching concept is also well adapted for use in automatic sensing, indicating or alarm circuits as well. It is therefore intended by the appended claims to cover all such modifications which fall within the scope of the invention.

What I claim is:

1. An automatic ranging electronic voltmeter for measuring electrical values comprising a voltage attenuator network having a plurality of taps for deriving at one of said taps an input voltage proportional to an electrical value to be measured, a plurality of balanced bridge circuits, each having an input and an output and adapted to be selectively driven to develop an output signal at the output when unbalanced in response to the magnitude and polarity of said input voltage, a meter movement, circuit means connecting the output of one of said bridge circuits to said meter movement for driving said meter movement in response to the output signal of said one of said bridge circuits, first switching means connected to be energized in response to the output signal at the output of another of said bridge circuits for phasing the polarity of said meter movement with the polarity of the electrical value being measured, a meter scale selector mechanism including driving means connected for energization in response to energization of said first switching means to position a scale for cooperative association with said meter movement in accordance with the value of said input voltage and second switching means connected to be energized in a rapid switching sequence in response to the output signal of said another of said bridge circuits for effecting a selection of taps on said attenuator and for electrically connecting said selected taps to the input of said bridge circuits to thereby apply said input voltage to said input to drive said bridge circuits.

2. An automatic ranging electronic voltmeter for measuring electrical values comprising a voltage attenuator network having a plurality of taps for deriving at one of said taps an input voltage proportional to an electrical value to be measured, a plurality of bridge circuits, each having an input and an output and adapted to be selectively driven upon the application of said input voltage at the input to develop an output signal at the output in response to the magnitude and polarity of said input voltage, a meter movement, circuit means connecting the output of one of said bridge circuits to said meter movement for driving said meter movement in response to the output signal of said one of said bridge circuits, first switching means connected to be energized in response to the output signal at the output of another of said bridge circuits for phasing the polarity of said meter movement with the polarity of the electrical value being measured, a meter scale selector mechanism including driving means connected for energization in response to energization of said first switching means to position a scale for cooperative association with said meter movement in accordance with the value of said input voltage and second relay switching means connected to be energized in a rapid switching sequence in response to the output signal of said another of said bridge circuits for effecting a selection of the taps on said attenuator and for electrically connecting said selected taps to the input of said bridge circuits to thereby apply said input voltage to the input of said bridge circuits.

3. An automatic ranging electronic voltmeter for measuring electrical values comprising a voltage attenuator network having a plurality of taps for deriving at one of said taps an input voltage proportional to an electrical value to be measured, a plurality of balanced bridge circuits including a meter movement driving bridge and first and second sensor bridges, each having an input and an output and adapted to be selectively driven to provide an output signal at the corresponding output in response to the magnitude and polarity of said input voltage, a meter movement, circuit means serially connecting the output of said meter movement driving bridge with said meter movement for driving said meter movement in response to the output signal of said meter movement bridge, first relay switching means connected to the output of said first sensor bridge and adapted to be energized in response to the output signal of said bridge for phasing the polarity of said meter movement with the polarity of the electrical value being measured, a meter scale selector mechanism including driving means connected for energization in response to energization of said first switching means to position a scale for cooperative association with said meter movement in accordance with the value of said input voltage, second relay switching means, means for connecting said second relay switching means to the output of said first and said second sensor bridges for energizing said second relay switching means through an alternate sequence and circuit means responsive to the energization of said second relay switching means for alternately connecting the input of said meter movement driving bridge to selected taps of said attenuator.

4. An automatic ranging electronic voltmeter as set forth in claim 3 wherein each sensor bridge includes an electronic switch adapted to be gated upon unbalance of the corresponding bridge, the gating of said switch providing the output signals of said sensor bridges to said second relay switching means.

5. An automatic ranging electronic voltmeter as set forth in claim 4 wherein said first sensor bridge further includes a pair of electronic switches adapted to be selectively gated in response to the magnitude and polarity of the electrical value being measured to provide an output signal for driving said first relay switching means and phasing the polarity of the meter movement.

6. An automatic ranging electronic voltmeter as set forth in claim 5 wherein said electronic switches are silicon controlled switches.

7. An automatic ranging electronic voltmeter for measuring AC and DC electrical values comprising a first and a second voltage attenuator network, said first attenuator network having a plurality of taps for deriving at one of said taps an input voltage proportional to an electrical value to be measured, means for serially connecting said first and said second attenuator networks only when an AC electrical value is being measured such that the taps of said first attenuator serve as input terminals for measurement of both AC and DC values, a plurality of bridge circuits, each having an input and an output and adapted to be selectively driven to develop an output signal at the output in response to the magnitude and polarity of said input voltage, a meter movement, circuit means connecting the output of one of said bridge circuits to said meter movement for driving said meter movement in response to the output signal of said one of said bridge circuits, first switching means connected to be energized in response to the output signal at the output of another of said bridge circuits for phasing the polarity of said meter movement with the polarity of the electrical value being measured, a meter scale selector mechanism including driving means connected for energization in response to energization of said first switching means so as to select scale for cooperative association with said meter movement in accordance with the value of said input voltage and second switching means connected to be energized in a rapid switching sequence in response to the output of said another of said bridge circuits for effecting a selection of the taps on said attenuator and for electrically connecting said selected taps to said input to drive said bridge circuits.

8. An automatic ranging electronic voltmeter for measuring AC and DC electrical values comprising a first and a second voltage attenuator network, said first attenuator network having a plurality of taps for deriving at one of said taps an input voltage proportional to an electrical value to be measured, means for serially connecting said first and said second attenuator networks only when an AC electrical value is being measured such that the taps of said first attenuator network serve as input terminals for measurement of both AC and DC values, a plurality of balanced bridge circuits, each having an input and an output and adapted to be selectively energized to develop an output signal at the output when unbalanced in response to the magnitude and polarity of said input voltage, a meter movement, circuit means connecting the output of one of said bridge circuits to said meter movement for driving said meter movement in response to the output signal of said one of said bridge circuits, first switching means connected to be energized in response to the output signal at the output of another of said bridge circuits for phasing the polarity of said meter movement with the polarity of the electrical value being measured, a meter scale selector mechanism including driving means connected for energization in response to energization of said first switching means to position a scale for cooperative association with said meter movement in accordance with the value of said input voltage and second switching means connected to be energized in a rapid switching sequence in response to the output signal of said another of said bridge circuits for effecting a selection of taps on said attenuator and for electrically connecting said selected taps to the input of said bridge circuits to thereby apply said input voltage to the input of said bridge circuits.

9. An automatic ranging electronic voltmeter for measuring AC and DC electrical values as set forth in claim 8 wherein said first voltage attenuator is a DC voltage attenuator comprising a plurality of serially connected resistors and said second voltage attenuator is an AC voltage attenuator comprising serially connected resistive and capacative elements and said means for serially connecting said attenuator networks includes a signal rectifier for rectifying AC electrical values applied to said second attenuator network and arranged such that the output of said rectifier is applied to said first voltage attenuator network.

10. An automatic ranging electronic voltmeter for measuring AC and DC electrical values as set forth in claim 8 further including a voltage divider so connected across the signal rectifier output that the ratio of AC input potential to the rectifier to the DC potential across said first voltage attenuator is 1/1.

11. An automatic ranging electronic voltmeter for measuring AC and DC electrical values comprising a first DC voltage attenuator network and a second AC voltage attenuator network, said DC network having a plurality of serially connected resistors having a plurality of taps for deriving at one of said taps an input voltage proportional to an electrical value to be measured, means for serially connecting said first and said second attenuator networks only when an AC electrical value is being measured such that the taps of said first attenuator serve as input terminals for measurement of both AC and DC values, said means for connecting said first and said second attenuator networks including a signal rectifier arranged for rectifying AC electrical values applied to said second attenuator, said signal rectifier having its output connected to the input of said first attenuator network, a plurality of balanced bridge circuits including a meter movement driving bridge and first and second sensor bridges, each having an input and an output and adapted to be selectively driven to provide an output signal at the output in response to the magnitude and polarity of said input voltage, a meter movement, circuit means serially connecting the output of said meter movement bridge which said meter movement for driving said movement in response to the output signal of said meter movement bridge, first relay switching means connected to the output of said first sensor bridge and adapted to be energized in response to the output signal of said bridge for phasing the polarity of said meter movement with the polarity of the electrical value being measured, a meter scale selector mechanism including driving means connected for energization in response to energization of said first switching means to position a scale for cooperative association with said meter movement in accordance with the value of said input voltage, second relay switching means, means for connecting said second relay switching means to the output of said first and said second sensor bridges for energizing said second switching means through an alternate switching sequence, circuit means responsive to the energization of said second relay switching means for alternately connecting the input of said meter movement driving bridge to selected taps of said DC attenuator network.

12. Apparatus for measuring AC and DC electrical values as set forth in claim 11 further including a voltage divider so connected across the signal rectifier output that the ratio of AC input potential to the rectifier to the DC potential across the first voltage attenuator is 1/1 and further including a silicon control switch connected at the output circuit of each sensor bridge and adapted to be gated upon an unbalance of the corresponding bridge to provide an output signal for energization of the second relay switching means and thereby energize said meter scale selector mechanism to automatically position the proper scale.

References Cited

UNITED STATES PATENTS

| | | | |
|---|---|---|---|
| 2,606,943 | 8/1952 | Barker | 324—115 |
| 2,865,000 | 12/1958 | Newell | 324—115 |
| 2,872,641 | 2/1959 | Hudson et al. | 324—115 XR |
| 2,872,643 | 2/1959 | Rockwell | 324—115 XR |
| 3,005,156 | 10/1961 | Hoberman | 324—115 |
| 3,016,488 | 1/1962 | Smith et al. | 324—115 |
| 3,179,886 | 4/1965 | Greibach | 324—115 XR |
| 3,237,102 | 2/1966 | Newell | 324—115 |
| 3,345,562 | 10/1967 | Rockwell | 324—115 XR |

RUDOLPH V. ROLINEC, *Primary Examiner.*

E. F. KARLSEN, *Assistant Examiner.*